United States Patent
MacAulay

(10) Patent No.: US 6,872,673 B2
(45) Date of Patent: Mar. 29, 2005

(54) LAMINATE AND USE OF SUCH LAMINATE AS A FACER IN MAKING INSULATION BOARDS AND OTHER PRODUCTS

(75) Inventor: John J. MacAulay, Grayslake, IL (US)

(73) Assignee: Edward Sider & Company, Northbrook, IL (US)

( * ) Notice: Subject to any disclaimer, the term of this patent is extended or adjusted under 35 U.S.C. 154(b) by 0 days.

(21) Appl. No.: 10/197,715

(22) Filed: Jul. 18, 2002

(65) Prior Publication Data

US 2004/0014382 A1 Jan. 22, 2004

(51) Int. Cl.[7] .............................................. B32B 27/00
(52) U.S. Cl. ...................... 442/152; 442/153; 442/228; 442/229; 442/230; 442/286; 442/287; 442/290; 442/370; 442/376; 442/377; 442/379; 442/394; 442/395; 442/398; 428/318.4; 428/319.3; 428/319.7; 428/319.9; 52/408
(58) Field of Search ................................ 442/152, 153, 442/228, 229, 230, 286, 287, 290, 376, 377, 379, 394, 395, 398, 370; 52/408; 428/318.4, 319.3, 319.7, 319.9

(56) References Cited

U.S. PATENT DOCUMENTS

| | | | |
|---|---|---|---|
| 3,903,346 A | 9/1975 | DeLeon et al. | 428/313 |
| 4,254,173 A | 3/1981 | Peer, Jr. | 428/204 |
| 4,284,674 A | 8/1981 | Sheptak | 428/69 |
| 4,509,307 A | 4/1985 | Beaudet | 52/309.4 |
| 4,572,865 A | 2/1986 | Gluck et al. | 428/309.9 |
| 4,764,420 A | 8/1988 | Gluck et al. | 428/317.7 |
| 4,985,106 A | 1/1991 | Nelson | 156/276 |
| 5,044,705 A | 9/1991 | Nelson | 312/228 |
| 5,345,738 A | 9/1994 | Dimakis | 52/309.9 |
| 5,565,252 A | 10/1996 | Finestone et al. | 428/40.9 |
| 5,695,870 A | 12/1997 | Kelch et al. | 428/318.4 |
| 6,044,604 A | 4/2000 | Clayton et al. | 52/309.9 |
| 6,093,481 A | 7/2000 | Lynn et al. | 428/217 |
| 6,355,701 B1 | 3/2002 | Soukup et al. | 521/117 |

Primary Examiner—Ula Ruddock
(74) Attorney, Agent, or Firm—Gerald K. White

(57) ABSTRACT

A laminate and insulation board containing such laminate and a method of making the board are disclosed. The products are useful for residences and light commercial buildings. Such boards possess high strength, excellent structural integrity, and excellent oxygen and water vapor barrier properties.

2 Claims, 1 Drawing Sheet

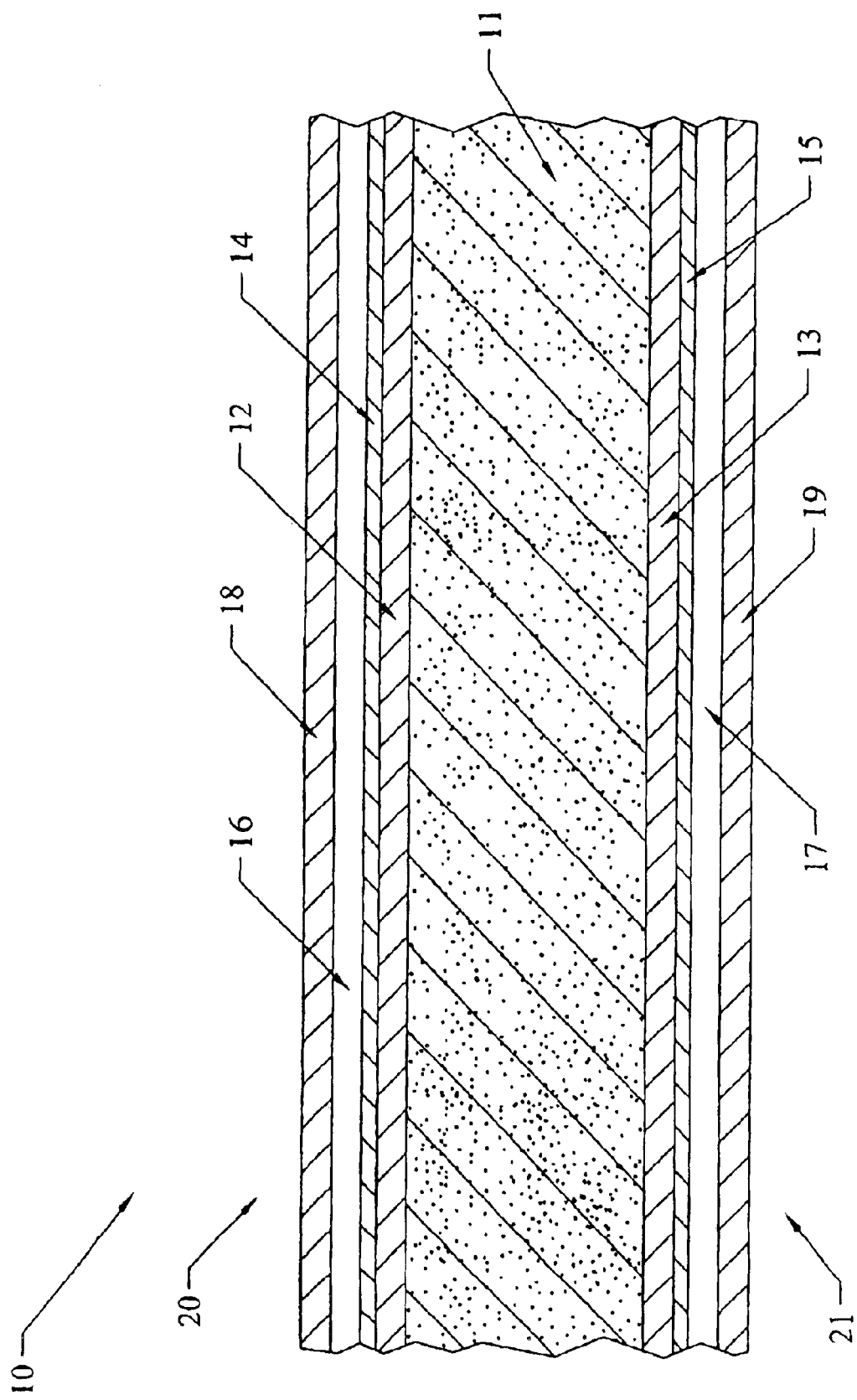

LAMINATE AND USE OF SUCH LAMINATE AS A FACER IN MAKING INSULATION BOARDS AND OTHER PRODUCTS

BACKGROUND OF THE INVENTION

Insulation boards, including foam insulation boards, are commonly used to enhance insulation of building structures. Relatively thin (about ¼ inch to about 3.0 inches), rectangular panels of foam board are commonly placed between the dry wall and building exteriors such as stone, brick, wood, stucco, etc. Such panels are referred to in the trade as "residential foam sheathing." Insulation boards employed in such applications may include, but are not limited to, those utilizing polyisocyanurate foam and extruded polystyrene, polyolefin, and polyurethane foams and beads.

A problem encountered when using thin insulation boards is physical damage from bending, impact, or breaking. Such damage may occur by acts of vandalism, high velocity winds, rain, hail, construction practices, and the like. For example, in construction, it is common for ladders placed against vertical walls to bend or break the insulation boards. It is also common for construction personnel to kneel upon insulation boards during construction.

Foam insulation boards are subject to oxygen and water vapor transmission and structural damage, both of which, over time, contribute to deterioration of the insulation properties and reduce the structural integrity of the board. A technique to address the problems of physical damage and loss of insulation properties is to apply or adhere a facing material (called a "facer") to at least one side of the board. Examples of such facing materials include plastic film, thin metal foil, paper or thin cellulose, non-woven polymeric fabrics, fiberglass scrims, and combinations of the foregoing.

Important properties of facers include serving as moisture vapor and oxygen transmission barriers, providing strength and structural integrity, ease of application, etc. Thin metal foils, such as aluminum, are commonly utilized in facers to provide moisture vapor and oxygen transmission barrier properties. However, such foils are often fragile and may contain pinholes, thereby reducing desired barrier properties.

Many laminates and/or facers for use in covering foam insulation boards and other products are described in the prior art. Such laminates are described in U.S. Pat. Nos. 6,355,701; 6,093,481; 6,044,604; 5,695,870; 5,565,252; 5,345,738; 5,044,705; 4,985,106; 4,764,420; 4,572,865; 4,509,307; 4,284,674; 4,254,173; and 3,903,346. However, none of the above-mentioned patents disclose laminates and/or facers having the sequence of layers and advantages derived thereby of this invention.

Above-mentioned U.S. Pat. No. 6,093,481 to Lynn et al. discloses a method for continuously manufacturing insulation boards by adhering facers over a foamed material. Illustrative of a facer that may be used is an outer layer of polyester film, an interior layer of fibrous material such as paper or glass, and a bottom layer of aluminum foil which is adhered to a foam core. Various layers including polymeric, metal foil, and fibrous materials are disclosed as possible components of the facers. Two trilaminate facers are described in FIG. 4 and at Column 5, lines 9–16 of the patent. Such trilaminates are further described as being preferred. As illustrated in the top portion of FIG. 4, an aluminum foil layer of the trilaminate is adhered to a foam core and a fibrous mid layer is adhered to the opposite side of the aluminum foil and also adhered to a tough polymeric outer layer. The patent discloses the use of another trilaminate on the opposite side of its foam core. Such trilaminate comprises the polymeric layer adhered to the foam, the same fibrous mid-layer, and an outer layer of aluminum foil.

The Lynn et al. patent also mentions the possible use of a coating to enhance gas barrier properties of its outer polymeric layer at Column 3, line 64-Column 4, line 8. Such coating is further described as a metallized polyester film coated with an UV and scratch-resistant oxidation barrier. With the properties of scratch resistance and UV resistance being mentioned, it is logical to believe that such coated layer would serve as an outer layer for the facer rather than disposed against the foam core of the insulation board or in a mid-portion of the facer.

Above-mentioned U.S. Pat. No. 3,903,346 to DeLeon et al. discloses a facer having aluminum foil adhered to a foam core and kraft paper adhered to said aluminum foil and a second aluminum foil adhered to said kraft paper to form an outer layer. The product described in this patent is believed to have been in commercial use for a considerable period of time and is one of the major facers used in the industry today.

The commercial product mentioned in the preceding paragraph includes an insulation board wherein polyisocyanurate foam is adhered to facers at each of its major opposed surfaces. The facers may be optionally adhered to the foam with use of a wash coat that interacts and bonds with the foam. One surface of aluminum foil is adhered to the wash coat or foam and the other surface to lightweight kraft paper (typically about 10 lbs. per 1,000 sq. ft.). The opposite surface of the paper is adhered to a second aluminum foil that serves as an outer layer for the insulation board.

It is desirable to provide a laminate and/or facer for uses that require improved oxygen and moisture vapor barrier properties, structural integrity, strength, and weatherability. Such improved properties are obtained due to the nature of the materials used in the laminate layers as well as by the sequence of such layers. In contrast to the prior art products mentioned above, the facer laminate of this invention provides improved protection to the foam core of an insulation board by utilizing a one-side metallized, preferably aluminum metallized, plastic layer adhered to one or both sides of the insulation foam board rather than aluminum foil. In the laminate of the invention, the bare or unmetallized side of the plastic layers or film is adhered to the foam core while the metallized side is adhered to fibrous material such as kraft paper. The fibrous material is then adhered to a protective plastic layer. Such sequence of materials of the invention provides superior protection of the foam core when contrasted with facers utilizing aluminum foil instead of metallized plastic proximate to the foam surface.

BRIEF DESCRIPTION OF THE DRAWING

The sole FIGURE is a cross-sectional view of the foam insulating board of the present invention.

SUMMARY OF THE INVENTION

The laminate of the invention comprises at least three layers that are adhered together. The first layer comprises a first plastic layer having one metallized surface and an opposed uncoated surface. The metallized surface of the first plastic layer is adhered to a surface of a fibrous layer. The opposed fibrous layer surface is adhered to a second plastic layer.

The insulation board of the invention comprises a foamed material having at least one of its generally flat major surfaces bonded to the uncoated surface of the first plastic layer of the above-described laminate or facer. A second facer may be bonded in the same manner to the opposed side of the generally flat primary surface of the foam.

The method of making a foam insulation board of the invention comprises contacting a foam with the above-discussed laminate to make a board.

DETAILED DESCRIPTION OF THE INVENTION

The laminate of the invention requires three essential layers to achieve the objectives of the invention, i.e., to provide a laminate or facer that is capable of protecting the foam of an insulation board by conferring strength and structural integrity to the board as well as protecting the foam from deteriorating from exposure to harmful oxygen and water vapor. The three layers function together to achieve such combination of desirable properties.

It is contemplated that the laminate of the invention is useful for applications where strength, structural integrity, and oxygen and water vapor transmission barrier properties are important. Such applications may include sheathing for insulation boards, wall boards, partition boards, roofing insulation, mobile home insulation, shipping and protective containers, packaging, etc.

The FIGURE illustrates the three essential layers in a cross-sectional view of insulation board 10. Foam core 11 is strengthened and protected by the use of facers 20 and 21 which are adhered to each primary opposed generally flat surface of foam core 11. Although two facers are illustrated in the FIGURE, it will be understood that a single facer placed on one side of the foam core could be utilized if desired.

The facers are bonded to the foam core at the uncoated or bare side of first plastic layers 12 and 13. Sufficient bonding is accomplished through contact of the facer while the foam is in a flowable condition, and thus an adhesive is not required to attach the facer to the foam. Such contact adhesion technique is known in the art, for example, in U.S. Pat. Nos. 6,355,701; 4,764,420; 4,572,865; and 3,903,346. These patents disclose various techniques for making insulation boards and are cited herein as suitable processes to be employed in making insulation boards with the materials of the present invention.

However, if one wishes to adhere the foam and facer after the foam has solidified, the facer film may be laminated to the foam board by any conventional method known in the art. Useful lamination methods include hot roll lamination of a heat activated adhesive layer on the facer film. Another method is liquid coating or spraying coating of an adhesive melt or liquid-based adhesive onto the facer film or foam board prior to lamination. An adhesive melt may also be extruded onto the facer film or foam prior to lamination. The facer film may be coextruded with an adhesive layer, and subsequently laminated to the foam board.

Facers 20 and 21 are pre-manufactured prior to being adhered as discussed above to foam 11 of insulation board 10. Such pre-manufacturing is accomplished by using a suitable adhesive to adhere metallized surfaces 14 and 15 of first plastic layers 12 and 13 to a surface of fibrous layers 16 and 17. A suitable adhesive is also used to adhere the opposite side of fibrous layers 16 and 17 to second plastic layers 18 and 19. All of such adhesion results in respective outer layers composed of said first and second plastic layers.

Facers 20 and 21 may be manufactured in a continuous manner with use of conventional laminating methods and apparatus. Typically, such methods involve passing the various plastic, fibrous, and one-sided metallized plastic layers through an adhesive applicator which applies the adhesive by spraying, brush coating, rolling, etc. onto the surface of the layer. The adhesive coated layers or webs are then fed into a laminating apparatus to become pressed together by a pair of opposed rollers. Heat may be employed to assist in curing the adhesives. A further illustration of a suitable technique can be found in U.S. Pat. No. 4,254,173.

Suitable adhesive materials for use in adhering the various layers of facers 20 and 21 include those adhesive materials known in the art as useful with plastic films. Such materials include polyolefin, copolymers such as ethylene/vinyl acetate, ethylene/acrylic acid, ethylene/n-butyl acrylate, ethylene/methylacrylate, ethylene ionomers, and ethylene or propylene graft anhydrides. Other useful adhesives include urethanes, copolyesters and copolyamides, styrene block copolymers such as styrene/butadiene and styrene/isoprene polymers, and can include tacky, pressure-sensitive adhesives. The adhesive material must not negatively impact the physical integrity or properties of the foam to a substantial degree.

Foam core 11 of the insulation board 10 may take the form of any insulation foam known in the art such as polyisocyanurate foam, extruded polystyrene foam, expanded polystyrene bead foam, extruded polyolefin foam, expanded polyolefin bead foam, and polyurethane foam. The foams may be of the open or closed cell.

The preparation of various foams suitable for use in the present invention are disclosed in U.S. Pat. Nos. 3,903,346; 4,509,307; 4,572,865; 4,764,420; 5,345,738; 5,695,870; 6,093,481; and 6,355,701.

An extruded polymer foam is generally prepared by heating a polymer material to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric, subatmospheric (evacuated or vacuum), or at an atmospheric level.

Expanded bead foams may be formed by expansion of pre-expanded beads containing a blowing agent. The expanded beads may be molded at the time of expansion to form articles of various shapes. Processes for making pre-expanded beads and molded expanded bead articles are taught in *Plastic Foams, Part II*, Frisch and Saunders, pp. 544–585, Marcel Dekker, Inc. (1973) and *Plastic Materials*, Brydson, 5th ed., pp. 426–429, Butterworths (1989), which are incorporated herein by reference.

The polyisocyanurate foams and polyurethane foams typically have a density of from about 10 kg/m.sup.3 to about 150 kg/m.sup.3 and suitably from about 10 kg/m.sup.3 to about 70 kg/m.sup.3 according to ASTM D-1622-88. the polyisocyanurate foams and polyurethane foams have an average cell size of from about 0.05 mm to about 5.0 mm and typically from about 0.1 mm to about 1.5 mm according to ASTM D3576-77.

The polystyrene foams typically have a density of from about 10 kilograms per cubic meter (kg/m.sup.3) to about 150 kg/m. sup. 3 and suitably from about 10 kg/m. sup. 3 to about 70 kg/m.sup.3 according to ASTM D-1622-88. The polystyrene foams have an average cell size of from about 0.1 mm to about 5.0 mm and typically from about 0.2 mm to about 1.5 mm according to ASTM D3576-77.

The polystyrene foams may be closed cell or open cell, but are suitably closed cell. Typically, such foams exhibit greater than 90 percent closed-cell according to ASTM D2856-87.

A strong bond between the facer and foam core of the insulation board is necessary to provide the desired strength, structural integrity, and oxygen and water vapor transmission barrier properties. Such bond must be sufficient to prevent separation of the facer and foam core.

The plastic layer bonded to the foam may comprise polyester, nylon, PVC, and the like. Polyester is a preferred plastic because of its ability to bond to flowable foams, its ability to be readily metallized, and its dimensional and thermal stability during manufacture of the insulation board. Polyester also serves to provide strength to the laminate. Typical, suitable plastic layer thicknesses are on the order of about 0.0005 inches but can be thicker or thinner, as desired.

As mentioned above, the first plastic layer is metallized on one of its sides. A metallizer is well known in the art and comprises a high vacuum chamber through which a moving web of plastic film is passed. In the vacuum chamber, a thin, uniform layer of a coating metal is deposited on one or both surfaces of the moving web. The metal typically used in the facer is aluminum, although copper, silver, and gold can also be used. The metal is vaporized in the high vacuum chamber, and the metal vapor is caused to condense on the moving web of plastic film. The metal may be heated in a resistance-heated "boat" containing a small amount of the flowable metal, or in an induction-heated crucible, or the vapor may be produced by electron beam evaporation or cathode sputtering. The metal is typically deposited on the web in a thin, uniform layer. The metallizing process is generally carried out as a semi-continuous process wherein an entire roll of plastic film is contained in the vacuum chamber, is unrolled to the vapor source, and rewound inside the vacuum chamber.

The metallized layer may comprise aluminum, copper, steel, silver, gold, or any other metal capable of providing sufficient oxygen and water vapor transmission barrier properties. Aluminum is preferred because of low cost and commercial availability. Metallization thicknesses must be sufficient to obtain the desired oxygen and water vapor transmission barrier properties. Very thin coatings on the order of several or even less millionths of an inch are suitable to obtain the desired properties. However, thicker coatings are also contemplated.

Fibrous layers 16 and 17 may comprise paper, glass fiber, fiberboard, paper, or other fibrous materials.

It is preferred to use paper as the fibrous layer because of its contribution to structural integrity, low cost, ease of handling, and ease of lamination. Paper is compatible with most adhesives.

The fibrous sheets employed in facers for the foam insulation boards of the invention are preferably comprised of any suitable paper such as, for example, kraft paper. The kraft papers may be based on either bleached or natural furnish and may have either MG or MF finishes. Laminates of the invention can be produced using paper ranging from about 5 lbs./1000 ft.$^2$ to about 50 lbs./1000 ft.$^2$. Typically, a range of from about 15 lbs./1000 ft.$^2$ to about 35 lbs/1000 ft.$^2$ can be used.

The second plastic or outer layers 18 and 19 may comprise polyethylene, polypropylene, polyester, PVC, nylon, and the like. Polyethylene is preferred because of its toughness, low cost, availability, ease of lamination with paper, and water repellency. Thickness of the second plastic layer may range from about 0.0002 to about 0.003 inches, with about 0.0005 to about 0.001 inches being typical.

The laminate and insulation boards of the invention possess a highly desirable combination of properties including strength, structural integrity or resistance to delamination, resistance to puncture, nailability, and resistance to the transmission of oxygen and moisture vapor. Such properties may be measured through utilization of a variety of standard and non-standard tests. For example, oxygen and moisture vapor transmission rates are commonly measured by standard tests established by the ASTM. Tensile strength, tear strength, and burst strength are also measured by standard tests, such as the Mullen Test and the Dart Drop Test. Structural integrity is commonly measured by determining resistance to delamination. Puncture resistance may be measured by pressure testing. Nailability may be measured through a variety of non-standard tests, such as observation of the effectiveness of the nailing procedure.

I claim:

1. An insulation board comprising a foamed material having first and second primary opposed generally flat surfaces, at least one of said foamed surfaces bonded to a laminate, said laminate comprising:
   (a) a polyester layer having a first metallized surface and a second uncoated surface opposed to said metallized surface;
   (b) a fibrous layer comprising paper ranging in weight from about 5 lbs/1,000 ft.$^2$ to about 50 lbs/1,000 ft.$^2$ and having first and second opposed surfaces, said first surface adhered to said first metallized surface of said plastic material; and
   (c) a polyethylene layer adhered to said second opposed surface of said fibrous layer, said foamed surface being bonded to said second uncoated surface of said first plastic layer of said laminate.

2. The insulation board of claim 1, wherein said metallized surface comprises aluminum.

* * * * *